United States Patent [19]
Lockett et al.

[11] Patent Number: 5,339,648
[45] Date of Patent: Aug. 23, 1994

[54] DISTILLATION SYSTEM WITH PARTITIONED COLUMN

[75] Inventors: Michael J. Lockett; Dante P. Bonaquist; Richard A. Victor, all of Grand Island, N.Y.

[73] Assignee: Praxair Technology, Inc., Danbury, Conn.

[21] Appl. No.: 102,326

[22] Filed: Aug. 5, 1993

[51] Int. Cl.$^5$ .............................................. F25J 3/02
[52] U.S. Cl. .......................................... 62/24; 62/36; 62/42; 196/100; 202/158
[58] Field of Search .................... 62/22, 36, 42, 11, 24; 202/158; 196/100

[56] References Cited

U.S. PATENT DOCUMENTS

| | | | |
|---|---|---|---|
| 1,962,176 | 6/1934 | DeBaufre | 62/22 |
| 2,295,256 | 9/1942 | Brugma | 196/73 |
| 2,471,134 | 5/1949 | Wright | 196/100 |
| 2,946,200 | 7/1960 | Schilling | 62/42 |
| 3,412,016 | 11/1968 | Graven | 202/158 |
| 3,632,334 | 1/1972 | Quintin | 202/158 |
| 4,230,533 | 10/1980 | Giroux | 202/158 |
| 4,826,574 | 5/1989 | Gourlia et al. | 202/158 |
| 5,265,428 | 11/1993 | Valencia et al. | 62/36 |

OTHER PUBLICATIONS

Kaibel, G.; Distillation Column Arrangements With Low Energy Consumption; Inst. Chem. Engrs., Sympossium Series No. 109, 1988, pp. 43-59.
Triantafyllou C. et al., The Design and Optimization Of Fully Thermally Coupled Distillation Columns; Trans T. Chem. E., vol. 70, Part A, Mar., 1992 pp. 118-132.
Humphrey, J. L. et al.; New Horizons In Distillation; Chemical Engineering, Dec., 1992 pp. 86-98.

*Primary Examiner*—Ronald C. Capossela
*Attorney, Agent, or Firm*—Stanley Ktorides

[57] ABSTRACT

A distillation system, particularly useful for the cryogenic distillation of feed air, employing a first column and a partitioned second column whereby three separate product streams may be withdrawn from the partitioned column.

16 Claims, 6 Drawing Sheets

DISTILLATION SYSTEM WITH PARTITIONED COLUMN

TECHNICAL FIELD

This invention relates generally to distillation, and is particularly useful in carrying out cryogenic distillation such as the distillation of feed air into product nitrogen, oxygen and crude argon.

BACKGROUND ART

A major cost in separating a feed into product by distillation is the capital cost of distillation columns. In the conventional cryogenic distillation of feed air to produce product nitrogen, product oxygen and product crude argon, three columns are used: a first column operating at a higher pressure wherein a preliminary separation is made, a second column operating at a lower pressure wherein product nitrogen and oxygen are made, and a third column wherein product crude argon is produced.

It is desirable to have a distillation system which can produce three products using only two columns as this would significantly reduce the capital cost of the distillation system. In the case of cryogenic air separation, it is desirable to be able to produce crude argon directly from the lower pressure column thus avoiding the need for a third column.

Accordingly, it is an object of this invention to provide a distillation column system comprising two columns wherein a product may be produced from an intermediate point of the second column as well as from the upper and lower portions of the second column.

It is another object of this invention to provide a cryogenic rectification method for processing feed air wherein crude argon is produced while employing only two columns.

SUMMARY OF THE INVENTION

The above and other objects which will become apparent to one skilled in the art upon a reading of this disclosure are obtained by the present invention one aspect of which is:

A distillation column system comprising a first column and a second column, said second column containing a longitudinally oriented partition extending through at least a part of the length of said second column to define a partitioned section, means for providing feed into the first column, means for passing reflux fluid taken from the first column into the second column, means for withdrawing waste from the partitioned section of the second column, and means for withdrawing product from the partitioned section of the second column.

Another aspect of the invention is:

A cryogenic rectification method comprising:

(A) passing feed air into a first column and separating the feed air by cryogenic rectification within the first column into a nitrogen-enriched fluid and an oxygen-enriched fluid;

(B) passing nitrogen-enriched fluid from the first column into a second column as reflux, said second column containing a longitudinally oriented partition extending through at least a part of the length of said second column to define a partitioned section.

(C) passing oxygen-enriched fluid from the first column into the partitioned section of the second column;

(D) withdrawing waste fluid from the partitioned section of the second column; and (E) withdrawing fluid having an argon concentration of at least 70 mole percent from the partitioned section of the second column.

As used herein, the term "column" means a distillation or fractionation column or zone, i.e., a contacting column or zone wherein liquid and vapor phases are countercurrently contacted to effect separation of a fluid mixture, as for example, by contacting of the vapor and liquid phases on vapor-liquid contacting elements such as on a series of vertically spaced trays or plates mounted within the column and/or on packing elements which may be structured and/or random packing elements. For a further discussion of distillation columns, see the Chemical Engineers' Handbook. Fifth Edition, edited by R. H. Perry and C. H. Chilton, McGraw-Hill Book Company, New York, Section 13, "Distillation", B. D. Smith, et al., page 13-3, *The Continuous Distillation Process*. The term, double column is used to mean a higher pressure column having its upper end in heat exchange relation with the lower end of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase while the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns. Cryogenic rectification is a rectification process carrier out, at least in part, at low temperatures, such as at temperatures at or below 150° K.

As used herein, the term "indirect heat exchange" means the bringing of two fluid streams into heat exchange relation without any physical contact or intermixing of the fluids with each other.

As used herein, the term "feed air" means a mixture comprising primarily nitrogen, oxygen and argon such as air.

As used herein, the terms "upper portion" and "lower portion" mean those sections of a column respectively above and below the midpoint of the column.

As used herein, the terms "longitudinally oriented" means in the direction of the major axis of the column.

As used herein, the term "crude argon" means a fluid having an argon concentration of at least 70 mole percent.

As used herein, the term "reflux" means liquid used for countercurrent contact with vapor in a continuous distillation process.

As used herein, the term "waste" means nitrogen-rich vapor withdrawn from the upper portion of the second column.

DETAILED DESCRIPTION

Figure 1:
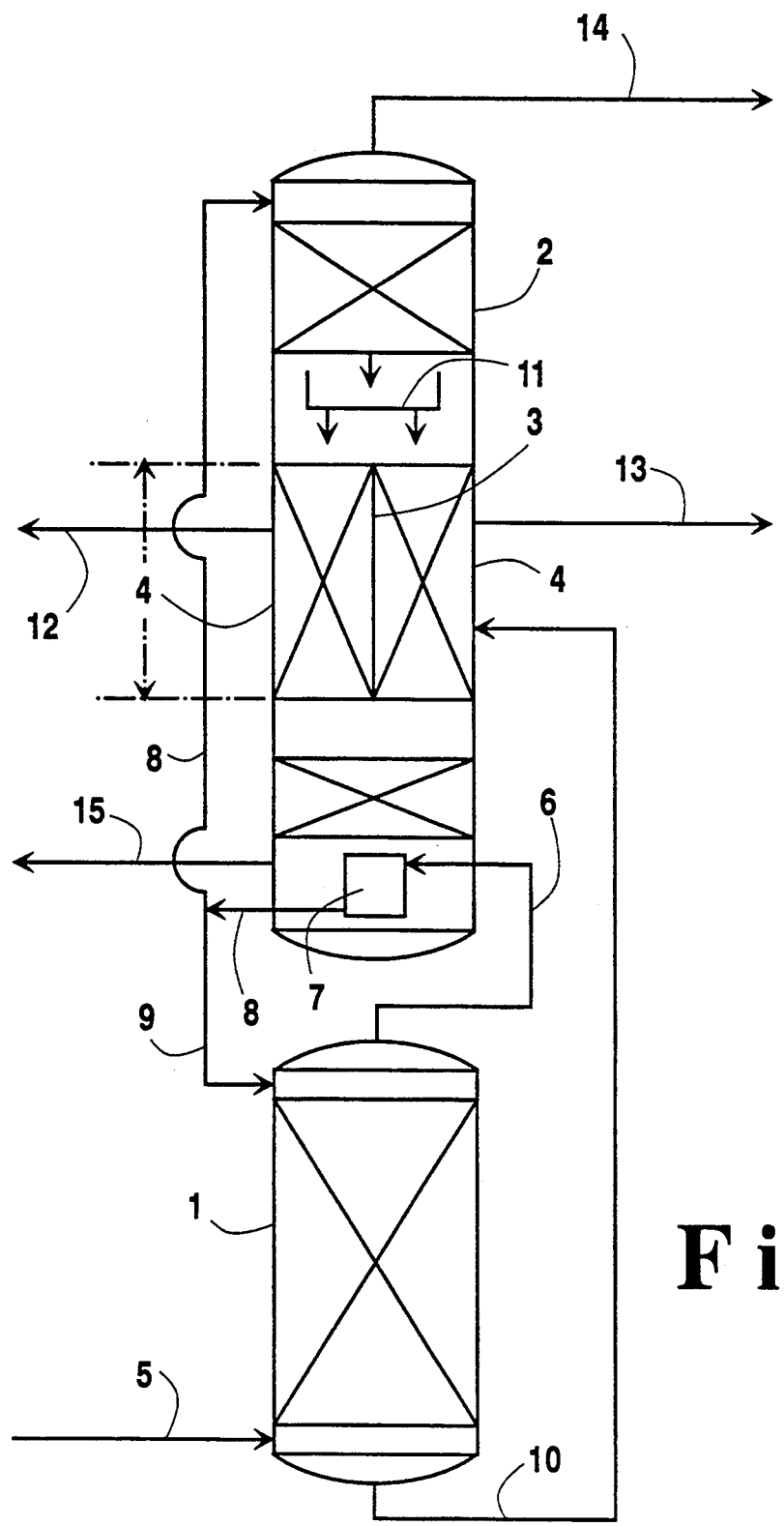
FIG. 1 is a cross-sectional schematic representation of one preferred embodiment of the invention.

The invention will be described in detail with reference to the Drawings. The numerals in the Drawings are the same for the common elements.

Figure 2:
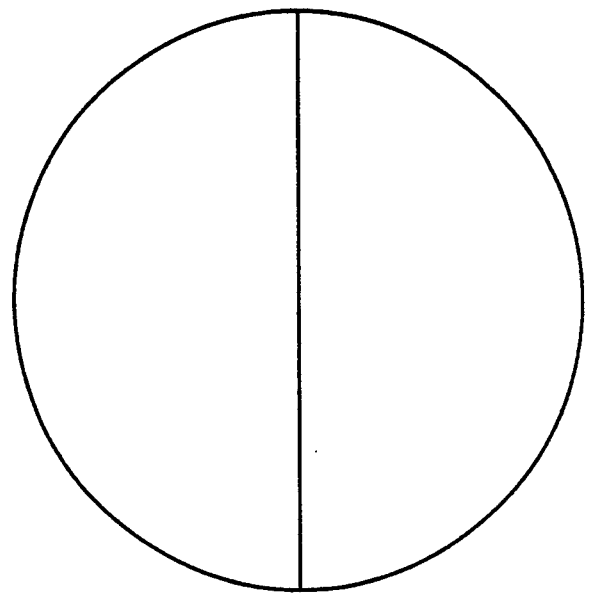
FIG. 2 is simplified overhead view of one partition shape useful in the practice of this invention.
Figure 3:
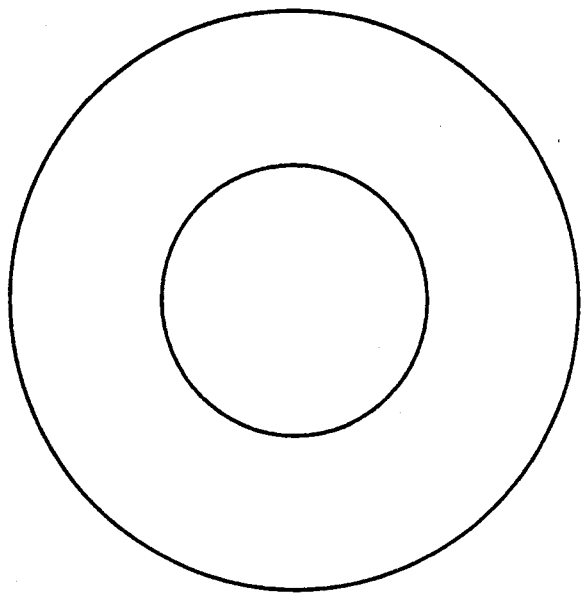
FIG. 3 is a simplified overhead view of another partition shape useful in the practice of this invention.

Referring now to FIG. 1, there is illustrated a distillation column system comprising first column 1 and second column 2. Second column 2 contains longitudinally oriented partition 3 which extends through at least a part of the length of second column 2 to define partitioned section 4 of the second column. Feed is provided into column 1 through conduit means 5. Top vapor from column 1 is withdrawn from the upper portion of column 1 and passed through line 6 into main condenser 7 and from main condenser 7 through line 8 into the upper portion of column 2 as reflux. A portion of the reflux is passed through line 9 into the upper portion of column 1. The cross-hatched areas represent the presence of mass transfer elements such as trays or packing. The packing, if used, may be either structured or random packing. The partition may be made of any suitable material so long as there is substantially no mass transfer across the partition. There may be heat transfer across the partition. The column cross-sectional area does not have to be divided equally by the partition. The partition can have any suitable shape such as the dividing plate shown in FIG. 2 or the internal cylindrical shell shown in FIG. 3. In the embodiment illustrated in FIG. 1 the partition is a dividing plate such as that illustrated in FIG. 2. Fluid from the lower portion of column 1 is passed through conduit means 10 into column 2 at the partitioned section.

In operation, descending liquid is collected, mixed and distributed to each side of the partitioned section by means distributor 11. The fraction of the liquid which is delivered to each side of the partitioned section is determined by the design of the distributor. For example, if using an orifice type distributor, the number of holes or the hole size would be different on each side of the partition. Vapor originating from the main condenser passes through a series of trays or packing before dividing to flow on the two sides of the dividing partition. The division of the vapor is controlled only by the physical requirement that the pressure drop from the bottom to the top of the partition must be the same on both sides of the partition. At the design stage, different types of packing or combinations of trays and packing can be specified on each side of the partition to alter the fraction of the vapor which flows on each side of the partition. Product fluid is withdrawn through line 12 from the partitioned section of column 2 and waste fluid is withdrawn through line 13 from the partitioned section of column 2 from the other side of the partition from which the product fluid is withdrawn. Other products may be taken from the upper portion and lower portion of column 2 through lines 14 and 15 respectively, preferably from above and below partitioned section 4.

The operation of the invention will be discussed in greater detail with reference to FIG. 1 and in the context of the cryogenic rectification of feed air to produce product nitrogen, product oxygen and product crude argon. In the cryogenic rectification of feed air, feed air is passed through line 5 into first column 1 operating at a pressure within the range of from 70 to 100 pounds per square inch absolute (psia). Within column 1, the feed air is separated by cryogenic rectification into nitrogen-enriched vapor and oxygen-enriched liquid. The oxygen-enriched liquid is passed from the lower portion of column 1 into second column 2 through line 10 into partitioned section 4. Second column 2 is operating at a pressure less than that of column 1 and generally within the range of from 16 to 25 psia. The nitrogen-enriched vapor is passed from the upper portion of column 1 into main condenser 7 wherein it is condensed by indirect heat exchange with column 2 bottoms to provide vapor upflow for column 2. Resulting nitrogen-enriched liquid is passed in line 8 into the upper portion of column 2 as reflux. A portion of the nitrogen-enriched liquid is passed in line 9 into the upper portion of column 1 as reflux.

Within column 2 the fluids introduced into the column are separated into nitrogen-rich fluid having a nitrogen concentration of at least 99 mole percent which is withdrawn from the upper portion of column 2 in line 14 and, if desired, recovered as product, and into oxygen-rich fluid having an oxygen concentration of at least 98 mole percent which is withdrawn from the lower portion of column 2 in line 15 and, if desired, recovered as product. A crude argon product stream 12, having an argon concentration of at least 70 mole percent, is withdrawn from the partitioned section of column 2 from the other side of the partition from where oxygen-enriched liquid stream 10 is provided into column 2. Crude argon product stream 12 may be liquid or vapor. Waste fluid is withdrawn from the partitioned section of column 2 in line 13, preferably above the point where oxygen-enriched liquid is provided into column 2, and from the other side of the partition from where crude argon product fluid is withdrawn from column 2.

In partitioned column 2 the liquid to vapor molar flow rate ratio is set to a level favorable to concentrating argon on the side of the partition in column 2 from which the crude argon product fluid is withdrawn. Specifically, the flow rate of liquid entering the partitioned section, on the side from which the crude argon product is withdrawn, is set such that most of the nitrogen in the liquid is vaporized by the rising vapor before the liquid reaches the crude argon withdrawal point.

This also minimizes the loss of argon in the vapor leaving the top of the partitioned section on the side from which the crude argon product is withdrawn. Setting the entering liquid flow rate much higher results in excessive nitrogen in the crude argon and setting it much lower results in excessive oxygen in the crude argon. In a conventional unpartitioned upper column there is less freedom to set the liquid to vapor molar flow rate ratio with the result that the maximum argon concentration of fluid produced in the column is limited to at most about 20 mole percent argon.

In the practice of this invention, the source of liquid reflux for the partitioned column is an additional column, identified as the first column. Previous practices employing a divided column provide reflux to the divided column by condensing the overhead vapor leaving the divided column. It is believed that the present invention has an advantage for control of the divided column. It is known that a divided column is difficult to control. The use of a separate column to provide reflux to the divided column effectively decouples the purity of the reflux from the operation of the divided column. In other words, upsets in composition or flow in the divided column will not affect the purity of the reflux which is supplied to the divided column by the other column. In conventional divided column practice, upsets in composition in the divided column will tend to influence the overhead product purity and hence the reflux composition which is returned to the column from the overhead condenser. The invention provides easier control for the operation of the column system.

In addition, in the practice of the present invention, a waste stream is withdrawn from the partitioned section of the column in contrast to conventional divided column practice which does not employ waste stream removal from the divided column. It is believed that the use of waste stream removal is an important innovative feature for a divided column which will allow easier control of the product purities and flowrates. The use of a waste stream introduces a fourth withdrawn stream from the divided column. The flowrate of the waste stream can be varied during column operation. The waste stream introduces an additional degree of freedom both at the design stage and during operation, both of which are beneficial.

Figure 4:
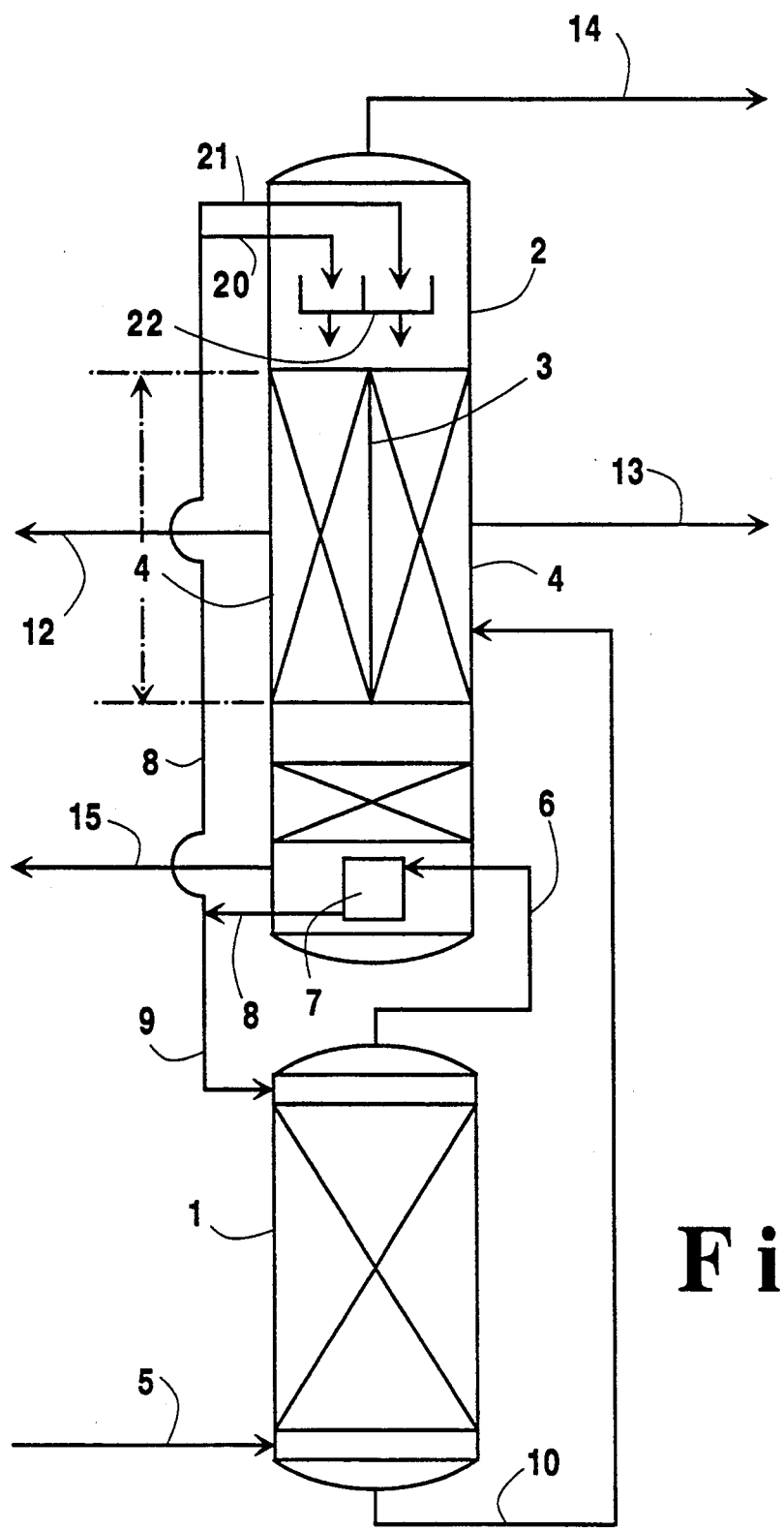
FIG. 4 is a cross-sectional schematic representation of a preferred embodiment of the invention employing a divided distributor.
Figure 5:
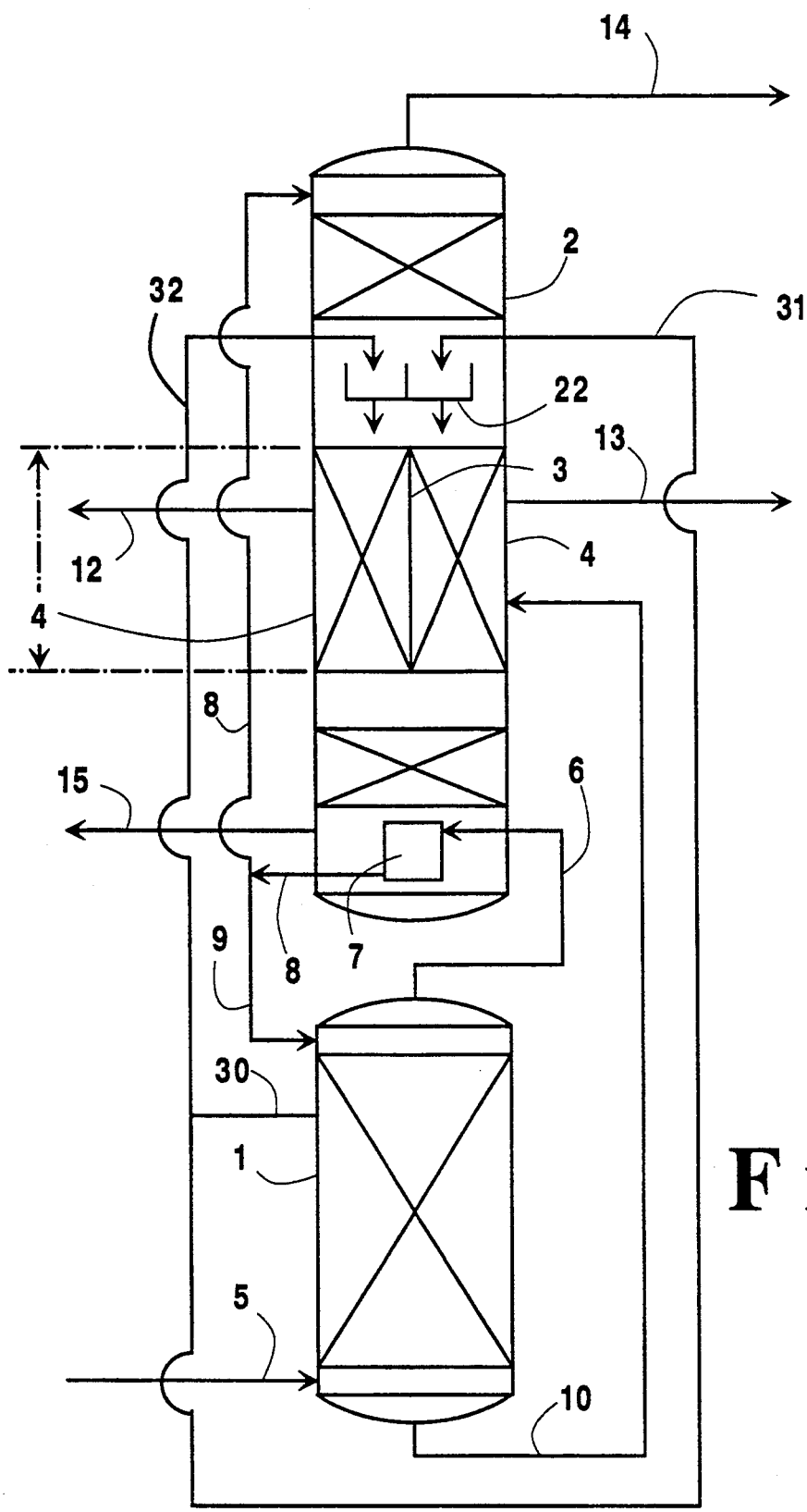
FIG. 5 is a cross-sectional schematic representation of another preferred embodiment of the invention employing a divided distributor.
Figure 6:
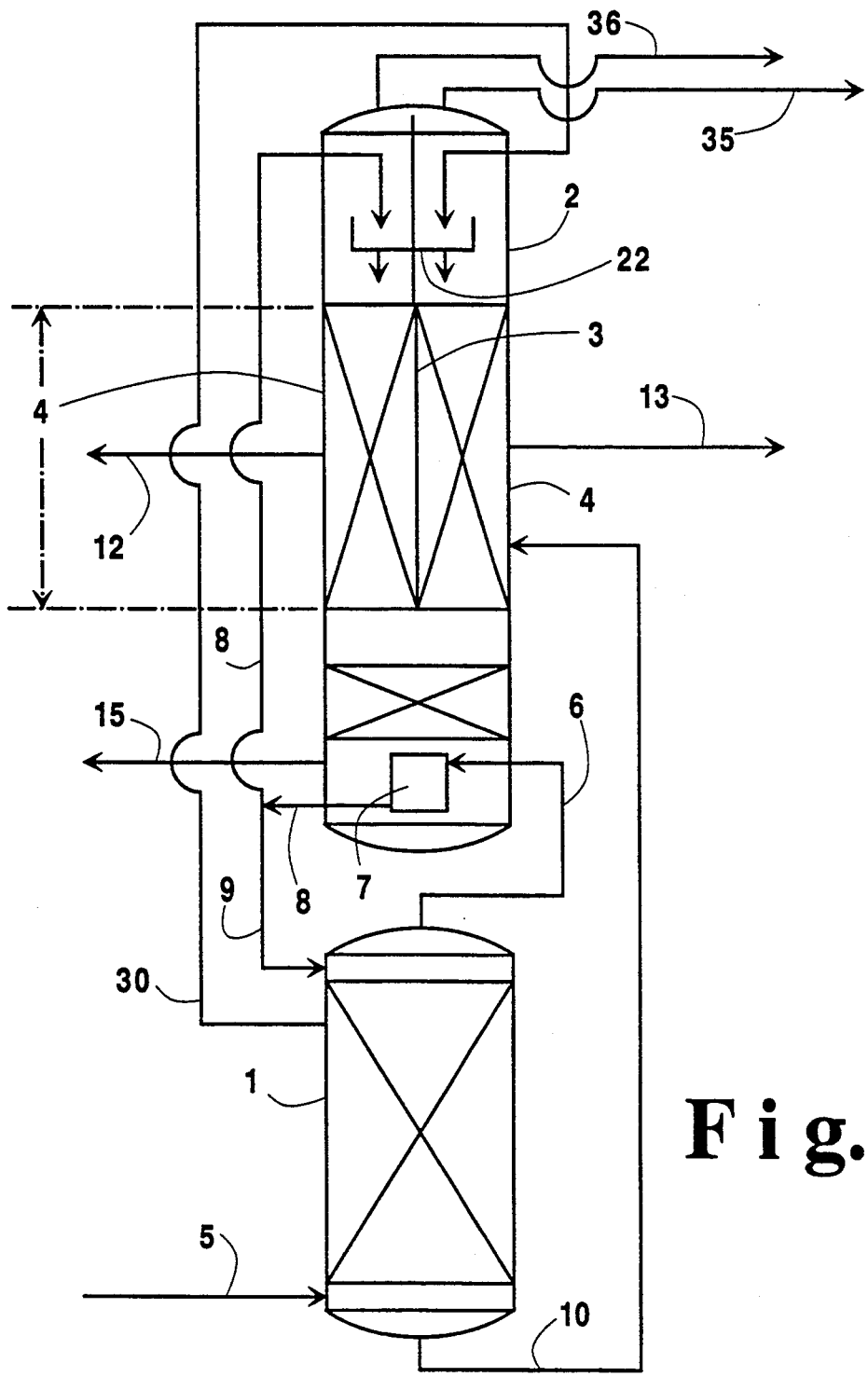
FIG. 6 is a cross-sectional schematic representation of another preferred embodiment of the invention employing a divided distributor.

FIGS. 4, 5 and 6 illustrate other embodiments of the invention which are directed to other arrangements which address the basic problem of a divided column that the flows to each side of the partition are difficult to control. These embodiments are directed to the control of the flow of liquid to each side of the partition. The flow of vapor remains uncontrolled during operation and is set by the design of the trays and/or packing and the column cross-sectional area for flow on each side of the partition. Both of these may be set at the design stage and not varied during operation.

In one embodiment the dividing partition is extended to the top of the part of the divided column containing trays or packing, and the section of trays or packing above the partition is eliminated. This is shown in FIG. 4. Such an arrangement allows easy control of the reflux liquid to each side of the divided column by means of a control valve (not shown) external to the column. In this arrangement, reflux is provided into column 2 through two lines 20 and 21 taken from line 8 which are each passed into a side of divided distributor 22 for flow into each side of the partitioned section. In all of the embodiments illustrated in the Drawings flow through the various lines is controlled in part by appropriate valving as is well known to those skilled in the art and these valves are not illustrated in the Drawings.

Another method for controlling liquid flow is to use two separate liquid streams derived from different places of the first column. Two embodiments of this method are illustrated respectively in FIGS. 5 and 6. The preferred embodiment is shown in FIG. 5 where the composition of a second reflux stream 30 taken from first column 1 approximately matches the fluid composition in column 2 just above the partition. The point at which the second nitrogen-containing reflux stream 30 is withdrawn from first column 1 is below the point where nitrogen-enriched top vapor 6 is withdrawn and generally at a point between 1 and 20 theoretical stages from the top of first column 1. Stream 30 is divided into streams 31 and 32 which are passed respectively to either side of divided distributor 22. In the embodiment illustrated in FIG. 6, both reflux streams obtained from column 1 are introduced at the top of column 2 on separate sides of partition 3 which is extended to the top of column 2. Product, e.g. nitrogen, streams 35 and 36 having different nitrogen purities or concentrations are obtained from each side of divided column 2. As discussed previously, the flowrate of the second reflux stream can be varied to each side of the divided column using an external control valve.

Figure 7:
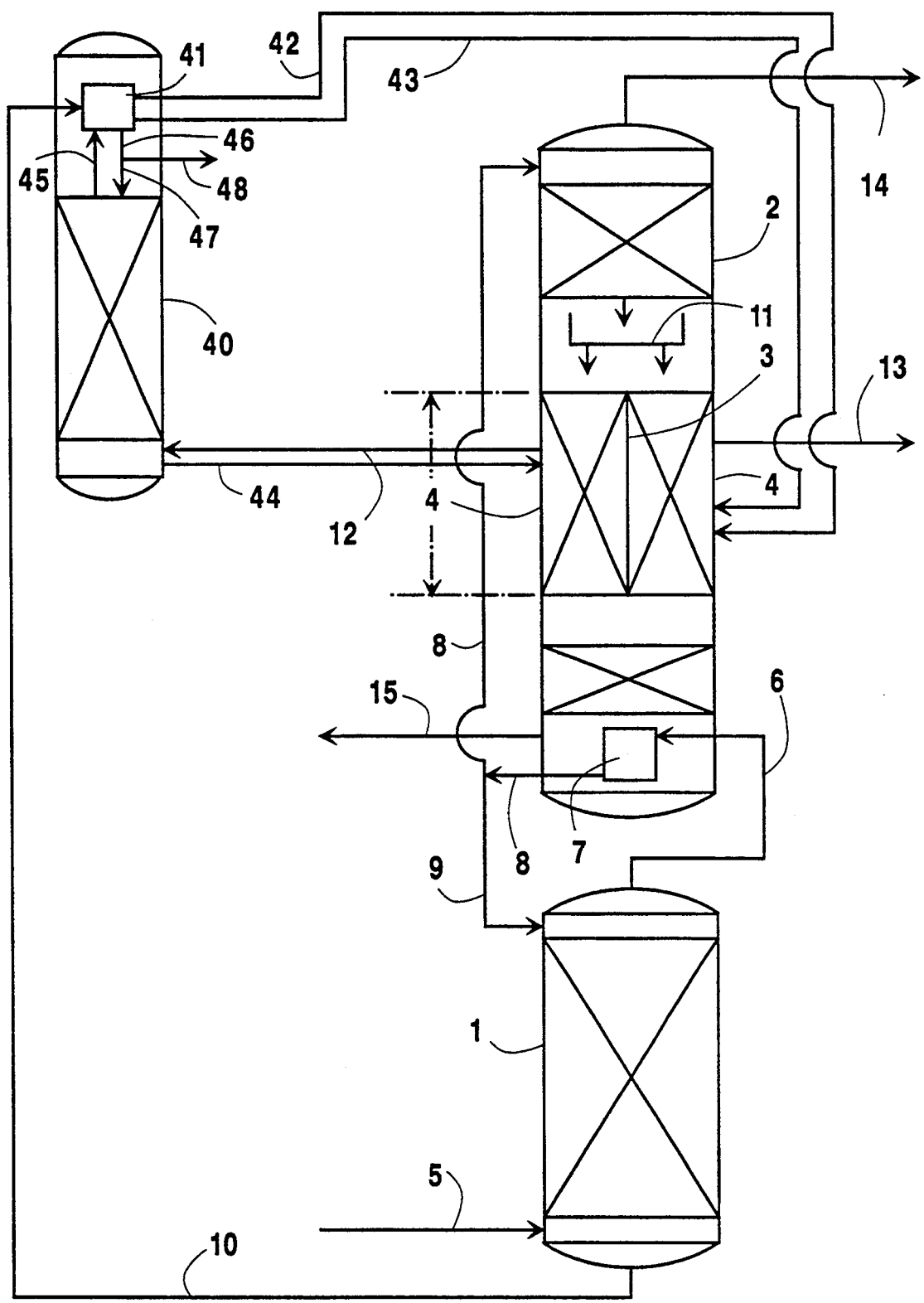
FIG. 7 is a cross-sectional schematic representation of one embodiment of the invention additionally employing a third column.

In the practice of this invention for the cryogenic separation of air, the need for a third column to produce crude argon is eliminated. However, if desired, one can employ a third column to produce high purity argon and one such arrangement is shown in FIG. 7 wherein crude argon product stream 12 is passed into refined argon column 40. Oxygen-enriched liquid 10 is passed into refined argon column top condenser 41 wherein it is partially vaporized and from which it is passed as vapor stream 42 and liquid stream 43 into the partitioned section of column 2. Within column 40 the crude argon feed is separated by cryogenic rectification into oxygen-richer liquid which is passed as stream 44 into column 2 and into refined argon having an argon concentration of at least 90 mole percent. In the embodiment illustrated in FIG. 7, refined argon vapor 45 is passed into top condenser 41 and resulting condensed refined argon liquid 46 is used as reflux in stream 47 and recovered as product 48. The refined argon may be recovered as vapor either alternatively or in addition to the liquid recovery illustrated in FIG. 7.

The following example is provided to further illustrate the invention and it is not intended to be limiting.

A computer simulation of the invention was carried out with the embodiment illustrated in FIG. 1 and using air as the feed. The second column operated 45 theoretical stages below and 10 theoretical stages above the partitioned section. On the crude argon product side of the partitioned section there were 10 theoretical stages above and 50 theoretical stages below the crude argon withdrawal point. On the waste stream withdrawal side of the partitioned section there were 5 theoretical stages above the waste stream withdrawal point, 15 theoretical stages between the waste stream withdrawal point and the oxygen-enriched liquid introduction point, and 15 theoretical stages below the oxygen-enriched liquid introduction point. Nitrogen product stream 14 comprises 99.98 mole percent nitrogen at a pressure of 16.5 psia and oxygen product stream 15 comprises 99.8 mole percent oxygen at a pressure of 17.25 psia. Crude argon product stream 12 comprises 84.3 mole percent argon and only 2.1 mole percent oxygen with the remainder mostly nitrogen. Thus, the cryogenic separation of feed air into product nitrogen, oxygen and crude argon, which heretofore required a three column system for effective separation, can now, with the practice of this invention, be attained with the use of only two columns.

Although the invention has been described in detail with reference to certain embodiments, those skilled in the art will recognize that there are other embodiments of the invention. For example, the invention may be employed to separate by distillation mixtures other than feed air into three product streams.

We claim:

1. A distillation column system comprising a first column and a second column, said second column containing a longitudinally oriented partition extending through at least a part of the length of said second column to define a partitioned section, means for providing feed into the first column, means for passing reflux fluid taken from the first column into the second column, means for withdrawing waste from the partitioned section of the second column, and means for withdrawing product from the partitioned section of the second column.

2. The distillation column system of claim 1 further comprising means for passing fluid from the lower portion of the first column into the partitioned section of the second column.

3. The distillation column system of claim 1 further comprising means for withdrawing product from the lower portion of the second column.

4. The distillation column system of claim 1 further comprising means for withdrawing product from the lower portion of the second column.

5. The distillation column system of claim 1 wherein the partition has a planar shape.

6. The distillation column system of claim 1 wherein the partition has a cylindrical shape.

7. The distillation column system of claim 1 further comprising a divided distributor within the column for receiving reflux liquid taken from the first column.

8. The distillation column system of claim 1 further comprising additional means for passing reflux fluid taken from the first column into the second column, said additional means communicating with the first column at a point below the point where the other means for passing reflux fluid taken from the first column into the second column communicates with the first column.

9. The distillation column system of claim 1 further comprising a third column, means for passing product withdrawn from the partitioned section of the second column into the third column, and means for withdrawing product fluid from the third column.

10. A cryogenic rectification method comprising:
    (A) passing feed air into a first column and separating the feed air by cryogenic rectification within the first column into a nitrogen-enriched fluid and an oxygen-enriched fluid;
    (B) passing nitrogen-enriched fluid from the first column into a second column as reflux, said second column containing a longitudinally oriented partition extending through at least a part of the length of said second column to define a partitioned section;
    (C) passing oxygen-enriched fluid from the first column into the partitioned section of the second column;
    (D) withdrawing waste fluid from the partitioned section of the second column; and
    (E) withdrawing fluid having an argon concentration of at least 70 mole percent from the partitioned section of the second column.

11. The cryogenic rectification method of claim 10 further comprising withdrawing fluid having a nitrogen concentration of at least 99 mole percent from the second column.

12. The cryogenic rectification method of claim 10 further comprising withdrawing fluid having an oxygen concentration of at least 98 mole percent from the second column.

13. The cryogenic rectification method of claim 10 further comprising passing additional nitrogen-containing fluid from the first column into the second column as reflux, said additional nitrogen-containing fluid taken from the first column at a point below the point where said nitrogen-enriched fluid passed from the first column into the second column as reflux is taken from the first column.

14. The cryogenic rectification method of claim 10 further comprising passing fluid withdrawn from the second column in step (E) into a third column and withdrawing from the third column a fluid having an argon concentration of at least 90 mole percent.

15. The cryogenic rectification method of claim 10 wherein the waste fluid is withdrawn from the partitioned section on the other side of the partition from where the fluid having an argon concentration of at least 70 mole percent argon is withdrawn.

16. The cryogenic rectification method of claim 10 wherein the waste fluid is withdrawn from the partitioned section on the same side of the partition from where the oxygen-enriched fluid is passed into the second column.

* * * * *

UNITED STATES PATENT AND TRADEMARK OFFICE
CERTIFICATE OF CORRECTION

PATENT NO. : 5,339,648
DATED : August 23, 1994
INVENTOR(S) : M.J. Lockett etal

It is certified that error appears in the above-identified patent and that said Letters Patent is hereby corrected as shown below:

Column 7:
   In claim 3, line 3 delete "lower" and insert therefor

--upper--.

Signed and Sealed this

Eleventh Day of October, 1994

Attest:

BRUCE LEHMAN

Attesting Officer

Commissioner of Patents and Trademarks